(12) United States Patent
Ho et al.

(10) Patent No.: US 7,479,229 B2
(45) Date of Patent: Jan. 20, 2009

(54) METHOD FOR REMOVING HEAVY METALS FROM AND DISSOLVING CALCIUM AND/OR MAGNESIUM SCALES IN WATER OR AQUEOUS SYSTEM

(75) Inventors: Guan-Huei Ho, Mississauga (CA); Jeng Yang, Taichung Hsien (TW); Tou-Hsiung Yang, Taichung Hsien (TW)

(73) Assignee: Tung Hai Biotechnology Corporation, Taichung Hsien (TW)

( * ) Notice: Subject to any disclaimer, the term of this patent is extended or adjusted under 35 U.S.C. 154(b) by 74 days.

(21) Appl. No.: 11/434,822

(22) Filed: May 16, 2006

(65) Prior Publication Data
US 2007/0125978 A1 Jun. 7, 2007

(30) Foreign Application Priority Data
Dec. 2, 2005 (TW) .............................. 94142601 A (51) Int. Cl.
*C02F 1/42* (2006.01)
(52) U.S. Cl. ...................... 210/687; 210/688
(58) Field of Classification Search .......... 210/687–688
See application file for complete search history.

(56) References Cited
U.S. PATENT DOCUMENTS 5,408,028 A * 4/1995 Wood et al. ................ 528/328
5,540,863 A * 7/1996 Wood et al. ................ 510/356
6,533,938 B1 3/2003 DiIorio et al.

OTHER PUBLICATIONS

Konishi, S., et al., "Binary metal-ion sorption during permeation through chelating porous membranes", *Journal of Membrane Science*, 111: pp. 1-6, 1996.

Jyo, A., et al., "Preparation of Phosphoric Acid Resins with Large Cation Exchanges Capacities from Macroreticular Poly(glycidyl methacrylate-*co*-divinylbenzene) Beads and Their Behavior in Uptake of Metal Ions", *J. Appl. Polym. Sco.*, 63: pp. 1327-1334, 1997.

Ibrahin, N., et al., "Novel Cation-Exchange Composites Resulting from Polymerization/Cross-Linking of Acrylic Acid/N-Methylolacrylamide Mixtures with Cellulose", *J. Appl. Polym. Sci.*, 49: pp. 291-298, 1993.

(Continued)

*Primary Examiner*—Chester T Barry
(74) *Attorney, Agent, or Firm*—Scully, Scott, Murphy & Presser, P.C.

(57) ABSTRACT

The present invention relates to a method for removing a heavy metal from and/or dissolving calcium and/or magnesium scales in water or an aqueous system comprising using γ-polyglutamic acid (γ-PGA, H form), and/or one or more of its salts (i.e., γ-polyglutamate in $Na^+$ form, γ-polyglutamate in $K^+$ form, and γ-polyglutamate in $NH_4^+$ form) and/or γ-polyglutamate hydrogel as chelating agents for removing heavy metals and/or dissolving agents for removing calcium and/or magnesium scales from water or the aqueous system.

10 Claims, 5 Drawing Sheets

γ - poly - glutamic acid (or γ-PGA)

Repeating unit of M(I) γ - poly - (L) - glutamate
[M(I) γ - (L) - PGA]

Repeating unit of $M(II)_{1/2}$ γ-poly - (D) - glutamate
[$M(II)_{1/2}$ γ - (D) - PGA]

OTHER PUBLICATIONS

Maeda, H., et al., "Studies of Selective Adsorption Resins. XXV. Preparation of Macroreticular Chelating Resins Containing Aminomethylphosphonic Acid Groups from Methyl Methacrylate/Divinylbenzene Copolymer Beads and Their Adsorpotion Capacity", *J. Appl. Polym. Sci.*, 33: pp. 1275-1281, 1987.

Bhattacharyya, D., et al., "Novel poly-glutamic acid functionalized microfiltration membranes for sorption of heavy metals at high capacity", *J. Membrane Sciences*, 141: pp. 121-135, 1998.

Yoon, S. H., et al., "Production of poly-γ-glutamic acid by fed-batch culture of *Bacillus licheniformis*", Biotechnology Letters, 22: pp. 585-588, 2000.

Yokoi, H., et al., "Flocculation Properties of Poly(γ-Glutamic Acid) Produced by *Bacillus subtilis*", *J. Fermemt. Bioeng.*, 82(1): pp. 84-87, 1966.

Hancock, R D. and Martell, A.E., "Ligand Design for Selective Complexation of Metal Ions in Aqueous Solution", Chem. Rev., 89: pp. 1875-1914, 1989; and.

Holtzer, A., et al., "The State of Aggregation of α-Helical Poly)L-Glutamic acid) in Aqueous Salt Solutions". *J. Am. Chem. Soc.*, 118: pp. 4220-4221, 1996.

Search Report dated May 24, 2006.

* cited by examiner

γ - poly - glutamic acid (or γ-PGA)

Repeating unit of M(I) γ- poly - (L) - glutamate
[M(I) γ- (L) - PGA]

Repeating unit of M(II)$_{1/2}$ γ-poly - (D) - glutamate
[M(II)$_{1/2}$ γ- (D) - PGA]

METHOD FOR REMOVING HEAVY METALS FROM AND DISSOLVING CALCIUM AND/OR MAGNESIUM SCALES IN WATER OR AQUEOUS SYSTEM

TECHNICAL FIELD OF THE INVENTION

The subject invention relates to completely removing toxic metals from water or aqueous systems with γ-polyglutamic acid (γ-PGA, H form), and/or γ-polyglutamates (in $Na^+$, $K^+$, and/or $NH_4^+$ forms), and/or γ-polyglutamate hydrogels (prepared from γ-polyglutamates in $Na^+$, $K^+$, and/or $NH_4^+$ forms) by the formation of enveloped aggregates of toxic heavy metal chelates with γ-PGA, γ-polyglutamates, and/or γ-polyglutamate hydrogels. The subject invention also relates to removing calcium and/or magnesium scales from water or aqueous systems by using γ-polyglutamic acid (γ-PGA, H form), and/or γ-polyglutamates (in $Na^+$, $K^+$, and/or $NH_4^+$ forms), and/or γ-polyglutamate hydrogels (prepared from γ-polyglutamates in $Na^+$, $K^+$, and/or $NH_4^+$ forms) as dissolving agents.

TECHNICAL BACKGROUND AND PRIOR ART

Conventional heavy metal separation processes involve the utilization of ion exchange (see Sengupta, A. K. (Ed.), *Ion Exchange Technology*, Technomic Publication Co. Inc., Pensylvania, 1997), precipitations, or membranes. Applicable membrane technologies include nanofiltration, ultrafiltration, and reverse osmosis. Microfiltration membranes containing metal chelating groups have also been used for heavy metal adsorption and separation (see Konishi et. al., *Binary Metal Ion Sorption During Permeation Through Chelating Porous Membranes, J. Memr. Sci.*, 111:1, 1996). Various adsorbents and ion exchange materials have been reported for metal ion entrapment. Conventional ion exchange groups are amines, sulfonic and carboxylic group such as amidoxime and phosphoric acid (see Jyo, A. et. al., *Preparation of Phosphoric Acid Resins with Large Cation Exchange Capacities from Macrorecticular Polyglycidyl Methacrylate-Co-Divinyl-Benzene Beads and Their Behavior in Uptake of Metal Ions, J. Appl. Polym. Sco.*, 63:1327, 1997). Acrylic acid (see Ibrakin, N., et al., *Novel Cation Exchange Composites Resulting from Polymerization/Cross-linking of Acrylic acid/N-Methylolacrylamide Mixtures with Cellulose, J. Appl. Polym. Sci.*, 49:291, 1993), aminomethyl-phosphoric acid (AMP) (see Maeda, H. et al., *Studies of Selective Adsorption Resin XXX, Prep. of Macrorecticular Chelating Resins Containing Aminomethylphosphoric Acid Groups From Methylmethacrylate/Divinylbenzene Copolymer Beads and their Adsorption Capacity, J. Appl. Polym. Sci.*, 33:1275, 1987) etc. have been reported in the literature. The reported order of the chelate stability with the AMP resins was $Cu^{+2}>Pb^{2+}>Ni^{+2}>Ca^{+2}$. Traditional ion exchange resins have been used extensively to recover heavy metals and to simultaneously obtain high quality water for reuse.

Porous membranes containing chelating agents provide enhanced mass transfer due to convection (see Konishi et. al., *Binary Metal Ion Sorption During Permeation Through Chelating Porous Membranes, J. Memr. Sci.*, 111:1, 1996). Functionalized membranes containing a large number of polymer chains for binding multiple metals to increase the capture capacity of the membranes have been reported (see Bhattacharyya et al., *Novel Poly-L-Glutamic Acid Fictionalized Microfiltration Membranes for Sorption of Heavy Metals at High Capacity, J. Membrane Sciences*, 141, 1998, 121-135). Cellulose and its derivatives provide the most versatile and inexpensive starting materials. $Pb^{++}$ ion with a hydration radius of 0.4 nm would require a maximum surface entrapment capacity of 34 mg Pb/g membrane with a representative 50 $m^2$/g BET membrane surface area for even only single-site available for one $Pb^{++}$ ion interaction. Obviously, the metal absorption capacity is still quite low for an industrial application.

To remove toxic heavy metal ions from water supply systems for drinking, city water supply, recreational or other industrial use, or reuse has been an important issue for everyone. Safety and health concerns are always a vital issue in the modern living. An easy, effective, and reliable method of removing toxic heavy metals from the water systems, and dissolving the scales of calcium or magnesium can be accomplished by using γ-polyglutamic acid (γ-PGA, H form) and/or one or more γ-polyglutamates (in $Na^+$, $K^+$, and/or $NH_4^+$ forms) and/or one or more γ-polyglutamate hydrogels (prepared from γ-polyglutamates in $Na^+$, $K^+$, and/or $NH_4^+$ forms). Moreover, the aggregates formed from the heavy metals and γ-polyglutamates can be easily separated by press filtration, or membrane ultrafiltration or by other centrifugation devices.

CONTENT OF THE INVENTION

The subject invention relates to a method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, and/or γ-polyglutamate in $NH_4^+$ form, and/or cross-linked γ-polyglutamate hydrogels (prepared from γ-polyglutamates in $Na^+$ form, γ-polyglutamate in $K^+$ form, and/or γ-polyglutamate in $NH_4^+$ form) as a chelating agent for removing a heavy metal and/or as a dissolving agent for removing calcium and/or magnesium scales from water or the aqueous system.

DETAILED DESCRIPTION OF THE INVENTION

Figure 1:
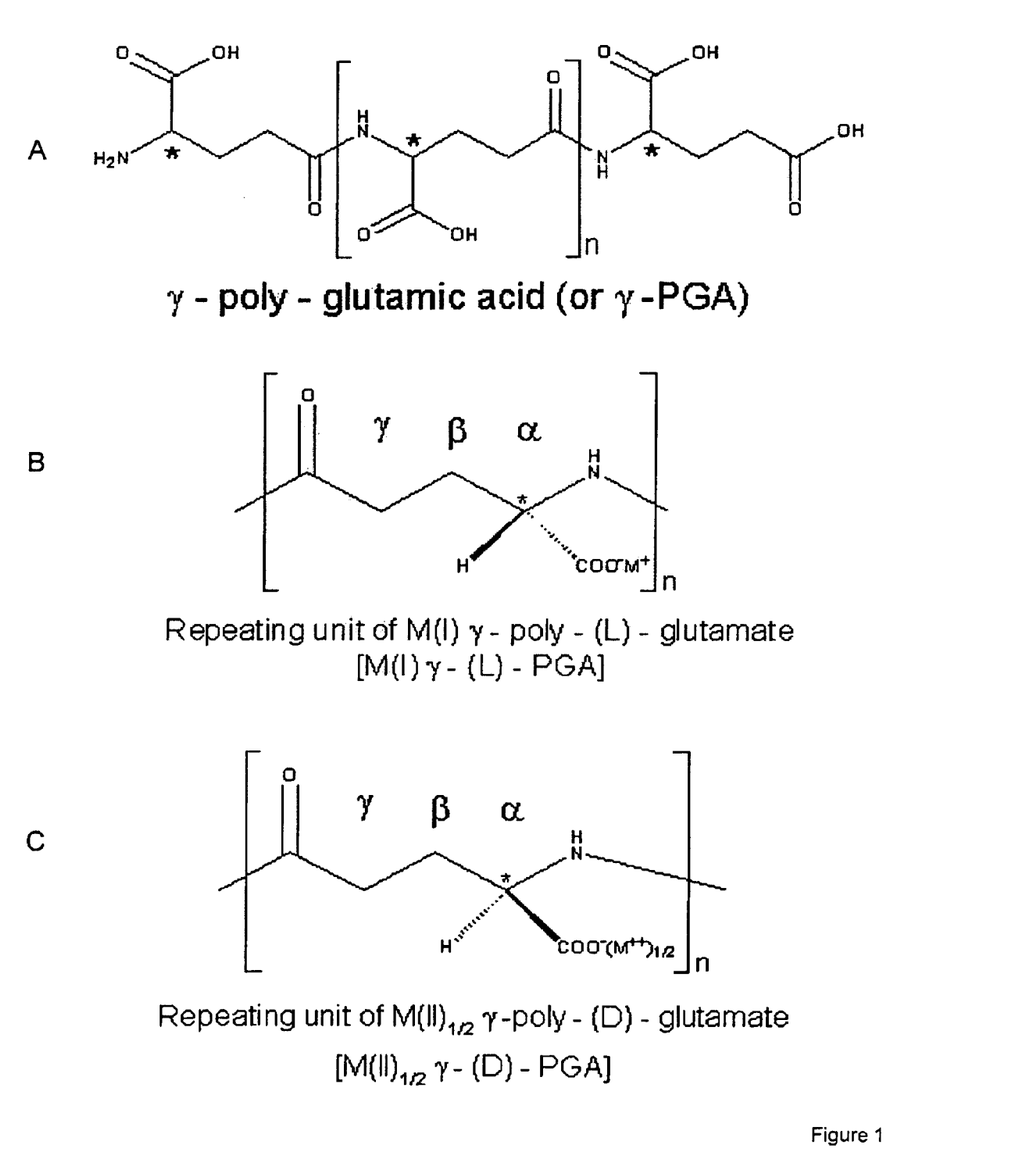
FIG. 1 shows the chemical structure of γ-polyglutamic acid (γ-PGA, H form) (A), γ-polyglutamate in $K^+$ form, γ-polyglutamate in $Na^+$ form, and γ-polyglutamate in $NH_4^+$ form (B), and γ-polyglutamate in $Ca^{++}$ form and γ-polyglutamate in $Mg^{++}$ form (C) M(I)=$K^+$, $Na^+$, or $NH_4^+$ M(II)=$Ca^{++}$ or $Mg^{++}$
Figure 2:
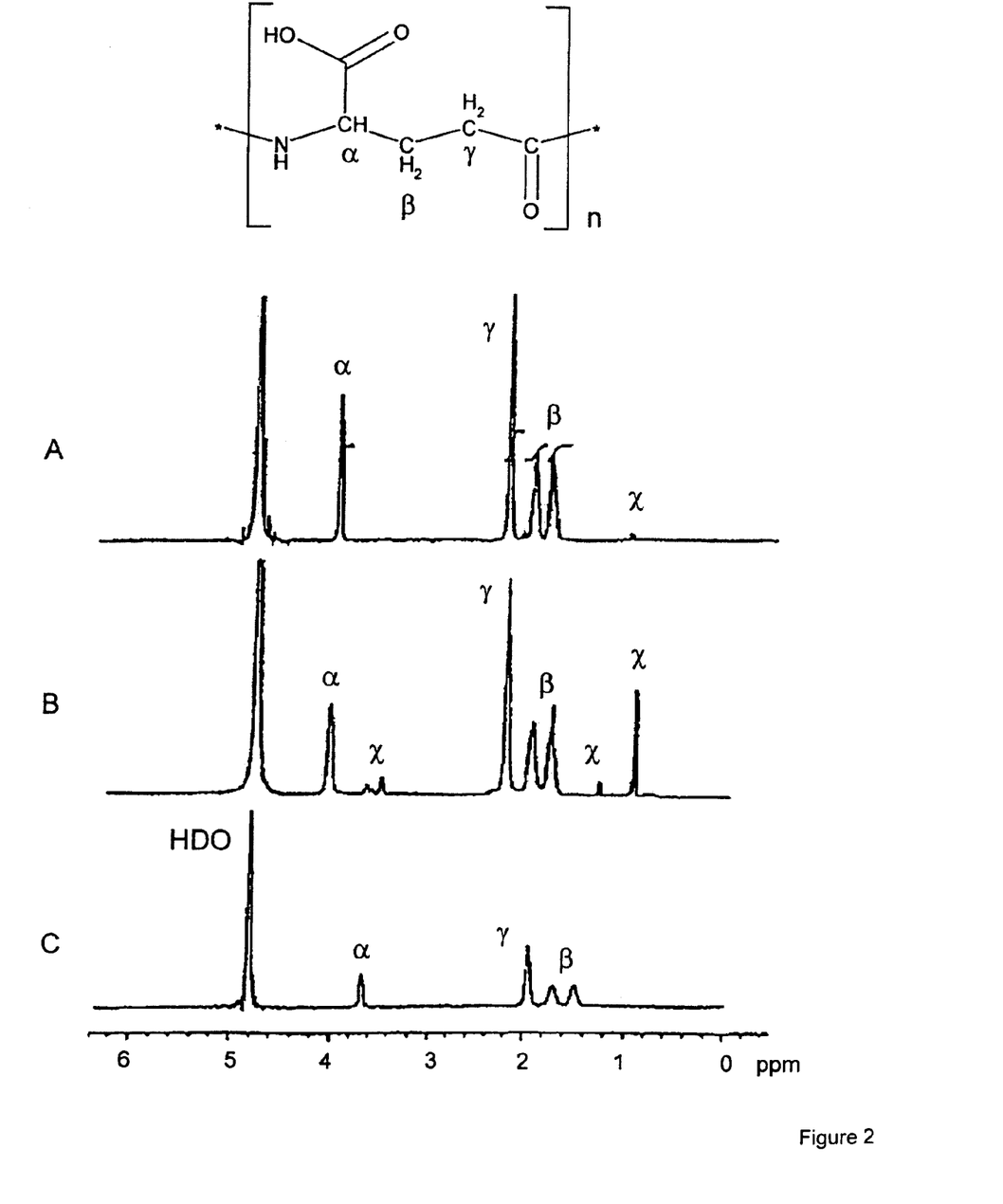
FIG. 2 shows 400 MHz $^1$H-NMR spectra of γ-polyglutamate in $Na^+$ form (A), γ-polyglutamate in $K^+$ form (B), and γ-polyglutamate in $NH_4^+$ form (C) in $D_2O$ at neutral pH and temperature of 30° C. Chemical shift was measured in ppm units from the internal standard. X indicates impurity peak.
Figure 3:
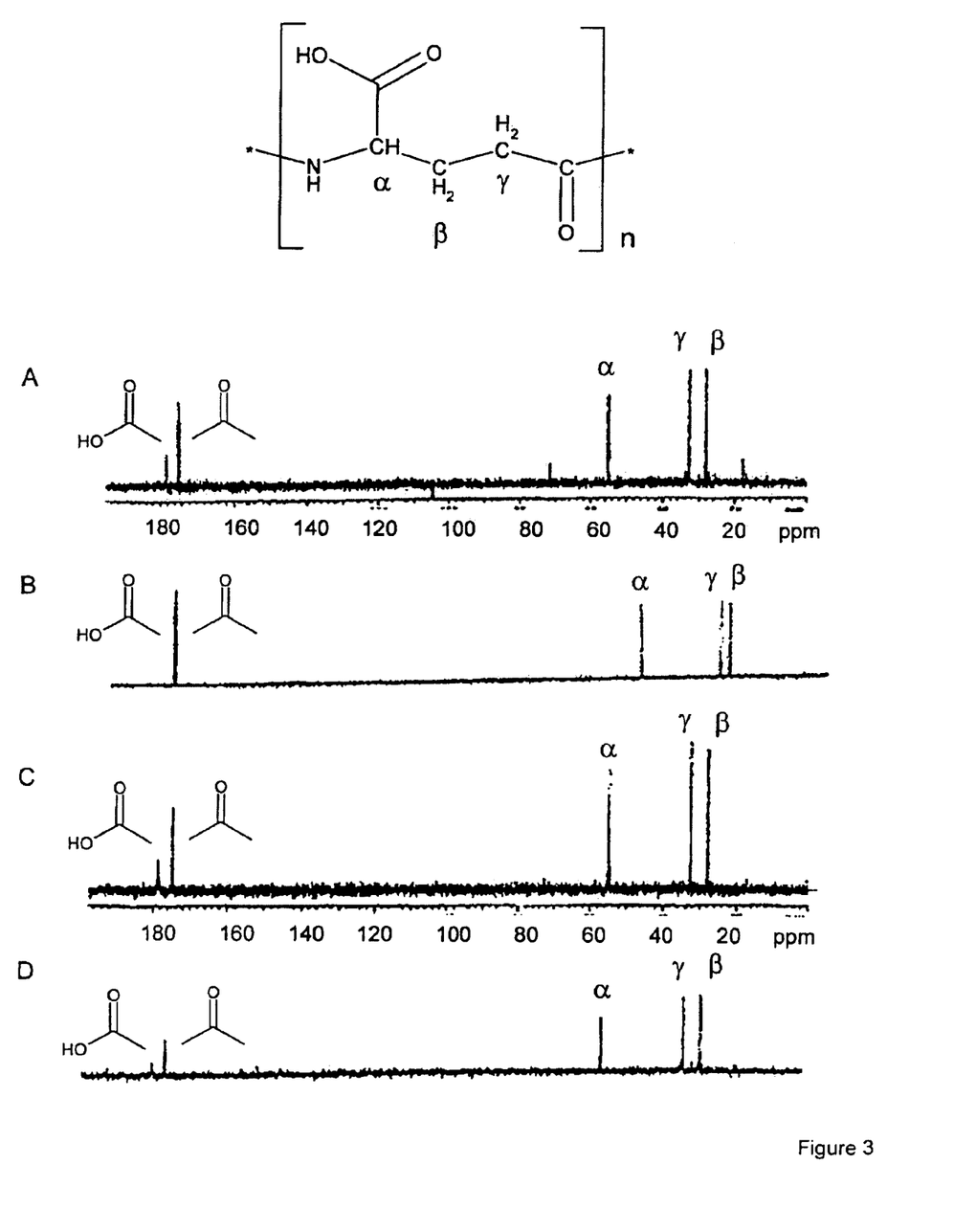
FIG. 3 shows $^{13}$C-NMR spectra of γ-polyglutamate in $K^+$ form (A), γ-polyglutamate in $Na^+$ form (B), γ-polyglutamate in $Ca^{++}$ form (C), and γ-polyglutamate in $Mg^{++}$ form (D) in $D_2O$ at neutral pH and temperature of 30° C. Chemical shift was measured in ppm units from the internal reference.
Figure 4:
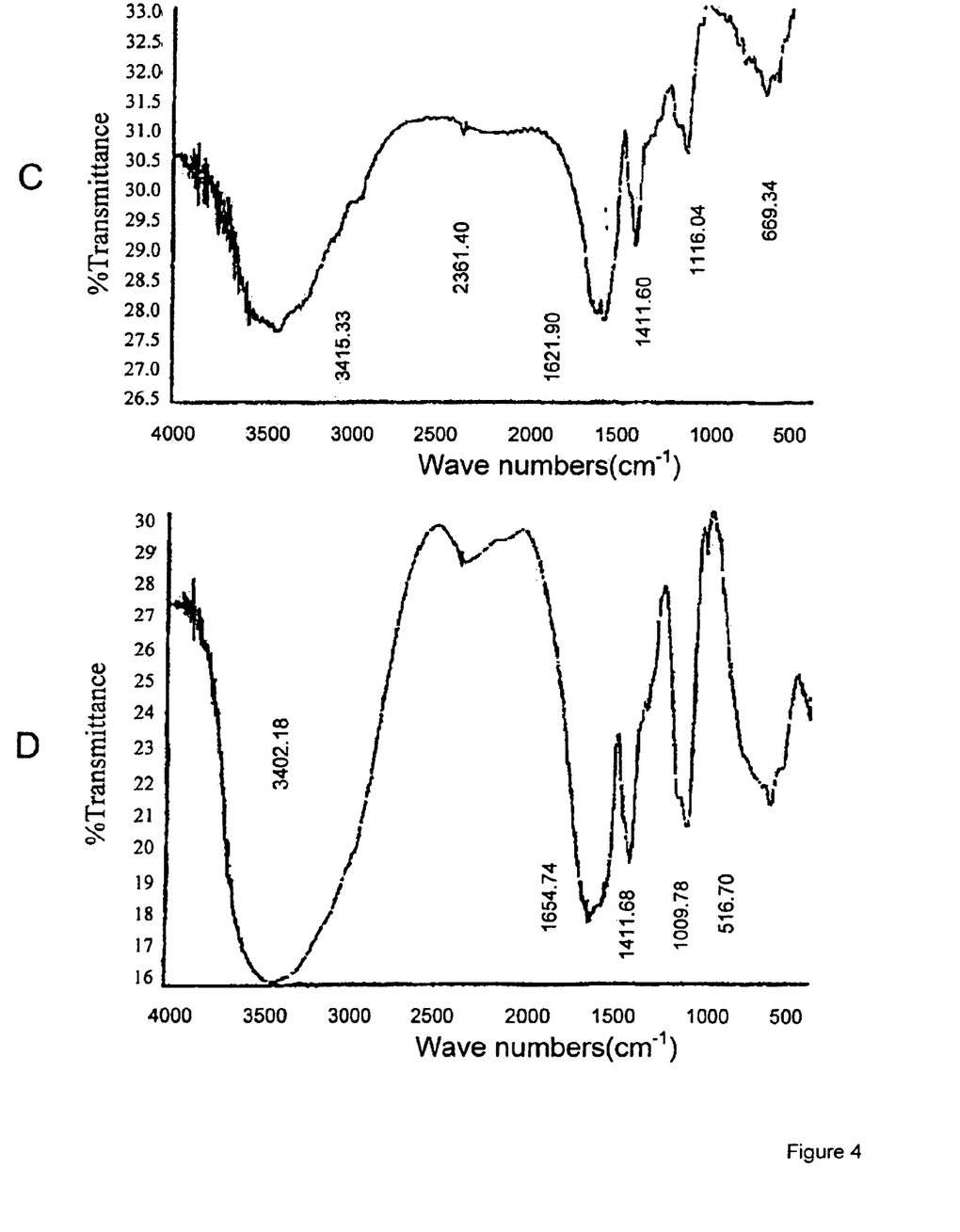
FIG. 4 shows infrared (FT-IR) absorption spectra of γ-polyglutamate in $Ca^{++}$ form (C) and γ-polyglutamate in $Mg^{++}$ form (D) in KBr pellet.
Figure 5:
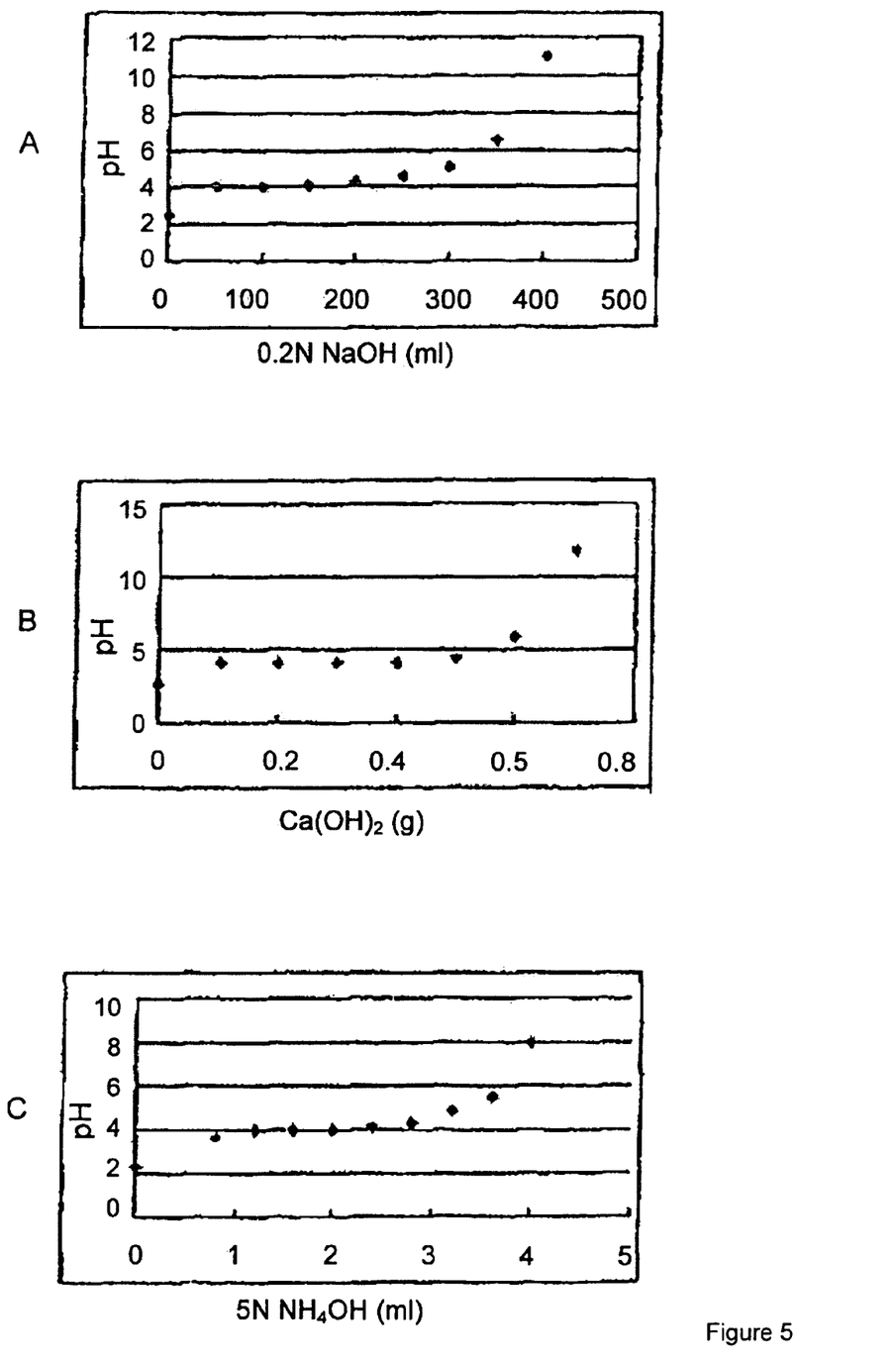
FIG. 5 shows pH-titration curves of 10% γ-PGA with 0.2N NaOH (A), 2% γ-PGA with $Ca(OH)_2$ (B), and 4% γ-PGA with 5N $NH_4OH$ (C) at 25° C.

γ-Polyglutamates are biodegradable, non-toxic biopolymers produced from L-glutamic acid via a submerge fermentation process (see Ho, Guan-Huei et al., γ-*Polyglutamic Acid (γ-PGA) Produced by Bacillus Subtilis* var. *natto, Structural Characterization, Chemical Properties, and Biological Functionality*, Submitted to the Ministry of Economic Affairs, ROC, Aug. 27, 2003, and *a Gold Prize Winner of The Second International Biotechnology and Medical Care Innovation Award* 2003, Nov. 6, 2003, *ROC*; and Yoon, S. H. et al., *Production of Poly-γ-Glutamic Acid, Biotechnology Letters*, 22: 585-588, 2000). The molecular structures of γ-polyglutamic acid (γ-PGA) and γ-polyglutamates (in $Na^+$, $K^+$, $NH_4^+$, $Ca^{++}$ and $Mg^{++}$ forms) are shown in FIG. 1 and the $^1H$-NMR, $^{13}C$-NMR, and FT-IR spectra are shown in FIGS. 2, 3, and 4, respectively. The spectral analytical data are summarized in Table 1. The titration curves are shown in FIG. 5. γ-Polyglutamates possess excellent water absorption properties, and good chelating and retention capacity for the toxic heavy metals normally found in water or aqueous systems, and their polyanionic properties are being explored for applications in flocculation of positively charged colloids or scales (see Yokai et al., *Floculation Properties of γ-PGA Produced by Bacillus subtilis., J. Fermemt. Bioeng.*, 82(1), 84-87, 1966 and Bhattacharyya, et al., *Novel Poly-L-Glutamic Acid Fictionalized Microfiltration Membranes for Sorption of Heavy Metals at High Capacity, J. Membrane Sciences*, 141(1998), 121-135) in the waste water systems.

sium scales in water or an aqueous system comprising using a γ-polyglutamate hydrogel as a chelating agent for removing a heavy metal and/or a dissolving agent for removing calcium and/or magnesium scales from water or the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked with diglycerol polyglycidyl ether, polyglycerol polyglycidyl ether, sorbitol polyglycidyl ether, polyoxyethylene sorbitol polyglycidyl ether, polysorbitol polyglycidyl ether, or polyethylene glycol diglycidyl ether, or a mixture thereof.

In another embodiment, the subject invention pertains to a method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, or γ-polyglutamate in $NH_4^+$ form, or a mixture thereof in combination with a γ-polyglutamate hydrogel as a chelating agent for removing a heavy metal and/or a dissolving agent for removing calcium and/or magnesium scales from water or the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked with diglycerol polyg-

TABLE 1

| ITEM | H | $Na^+$ | $K^+$ | $NH_4^+$ | $Ca^{++}$ | $Mg^{++}$ |
|---|---|---|---|---|---|---|
| a. $^1H$-NMR(400 MHz, $D_2O$, 30° C.) Chemical shift in ppm: | | | | | | |
| α CH | | 3.98 | 4.00 | 3.68 | 4.18 | 4.08 |
| β $CH_2$ | | 1.98, 1.80 | 1.99, 1.80 | 1.68, 1.48 | 2.16, 1.93 | 2.05, 1.88 |
| γ $CH_2$ | | 2.19 | 2.19 | 1.93 | 2.38 | 2.31 |
| b. $^{13}C$-NMR(67.9 MHz, $D_2O$, 30° C.) Chemical shift in ppm; | | | | | | |
| α CH | | 56.43 | 62.21 | | 62.21 | 62.10 |
| β $CH_2$ | | 31.61 | 35.16 | | 36.17 | 35.11 |
| γ $CH_2$ | | 34.01 | 39.74 | | 39.68 | 39.60 |
| CO | | 182.21 | 182.11 | | 182.16 | 182.12 |
| $COO^-$ | | 182.69 | 185.46 | | 185.82 | 185.16 |
| a. FT-IR absorption (KBr), $cm^{-1}$ | | | | | | |
| C=O, Stretch | 1739 | | | | | |
| Amid I, N—H bending | | 1643 | | 1643 | 1622 | 1654 |
| Amide II, stretch | | 1585 | | | | |
| C=O, symmetric stretch | 1454 | 1402 | | 1395 | 1412 | 1411 |
| C—N, stretch | 1162 | 1131 | | 1139 | 1116 | 1089 |
| N—H, oop bending | 698 | 707 | | 685 | 669 | 616 |
| O—H, stretch | 3449 | 3436 | | 3443 | 3415 | 3402 |
| b. Thermal analysis: | | | | | | |
| Hydrated water | 0 | 10% | 42% | | 20% | 40% |
| Dehydration temperature, ° C. | | 109. | 139. | | 110 | 122 |
| $T_m$, ° C. | 206 | 160 | 193, 238 | 219 | — | 160. |
| $T_d$, ° C. | 209.8 | 340 | 341 | 223 | 335.7 | 331.8 |

In one embodiment, the subject invention relates to a method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, or γ-polyglutamate in $NH_4^+$ form, or a mixture thereof as a chelating agent for removing a heavy metal and/or a dissolving agent for removing calcium and/or magnesium scales from water or the aqueous system.

The subject invention also relates to a method for removing a heavy metal from and/or dissolving calcium and/or magnelycidyl ether, polyglycerol polyglycidyl ether, sorbitol polyglycidyl ether, polyoxyethylene sorbitol polyglycidyl ether, polysorbitol polyglycidyl ether, or polyethylene glycol diglycidyl ether, or a mixture thereof.

The subject invention further relates to a method for removing a heavy metal from and/or dissolving calcium and/or magnesium scales in water or an aqueous system comprising using a γ-polyglutamate hydrogel as a chelating agent for removing a heavy metal and/or a dissolving agent for removing calcium and/or magnesium scales from water or the aqueous system, wherein said γ-polyglutamate hydrogel is prepared from γ-polyglutamate in Na$^+$ form, γ-polyglutamate in K$^+$ form, or γ-polyglutamate in NH$_4^+$ form, or a mixture thereof cross-linked by irradiation with gamma ray or electron beams.

Moreover, the subject invention also relates to a method for removing a heavy metal from and/or dissolving calcium and/or magnesium scales in water or an aqueous system comprising using γ-polyglutamic acid (γ-PGA, H form), γ-polyglutamate in Na$^+$ form, γ-polyglutamate in K$^+$ form, or γ-polyglutamate in NH$_4^+$ form, or a mixture thereof in combination with a γ-polyglutamate hydrogel as a chelating agent for removing a heavy metal and/or a dissolving agent for removing calcium and/or magnesium scales from water or the aqueous system, wherein said γ-polyglutamate hydrogel is prepared from γ-polyglutamate in Na$^+$ form, γ-polyglutamate in K$^+$ form, or γ-polyglutamate in NH$_4^+$ form, or a mixture thereof cross-linked by irradiation with gamma ray or electron beams.

γ-Polyglutamic acid (γ-PGA, H form) is a glutamic acid polymer with a degree of polymerization ranging from 1,000 up to 20,000, and formed in only γ-peptide linkage between the glutamic moieties. γ-PGA contains a terminal amine and multiple α-carboxylic acid groups. The polymer generally exists in several states: helix, random coil, β-sheet, helix-coil transition region and enveloped aggregate, depending on the environmental conditions such as pH, ionic strength and other cationic species. With circular dichroism (CD), the amount of helical form present is usually measured as a function of magnitude of the spectra at 222 nm. Helix-coil transition takes place from about pH 3 to 5 for free form of γ-polyglutamic acid (γ-PGA) in homogeneous, aqueous. solution, and shift to a higher pH 5 to 7 for a bonded form. The transition from random coil to enveloped aggregation occurs when complex-coordination with certain divalent and some higher metallic ions through drastic conformational change of γ-PGA from linear coil into enveloped aggregate.

Without being bound with theory, it is believed that the adsorption of metal ions onto γ-PGA (a polyelectrolyte anion) involves two possible mechanisms: (A) direct interaction of metal ions with carboxylic sites and (B) retention of heavy metal counter-ions in mobile form by the electrostatic potential field created by the COO$^-$ groups. Besides the interactions with the carboxylic groups, amide linkages may also provide weak interaction sites. In addition to the conformational structure and ionization of γ-PGA, it is also important to know the types of hydrolyzed metal species, which are present in aqueous solutions. The formation of a variety of different species may result in different adsorption capacities of metals. The term "heavy metal" used herein generally refers to, but is not limited to Pb, Cd, Al, Fe, Cu, Mn, Cr, Zn, Ni, or Se. An excellent review of metal ion chelation and metal ion-ligand correlations was reported by Hancock and Martell (see Hancock, R. D. and Martell, A. E., *Ligand Design for Selective Complexation of Metal Ions in Aqueous Solution, Chem. Rev.*89 (1989), 1875-). The metal ion-chelate/complexation stability constants Log K$_1$ (L) increase with the acidity of the metal ions (first metal hydrolysis constant, Log K$_1$ (OH$^-$)). The Log K$_1$ (L)s are 4.0, 4.5, 5.5, 7.7, and 12 for Cd$^{++}$, Pb$^{++}$, Ni$^{++}$, Cu$^{++}$, and Fe$^{+++}$ with glutamic acid, respectively. The corresponding log K$_1$ (OH$^-$)s are 4.2, 6.3, 4.6, 7.0, and 11, respectively. The formation of a variety of different species may lead to different molar absorption capacities of metal ions.

Moreover, according to the subject invention, water or aqueous solution systems to be treated normally have a pH of from 5.0 to 8.0.

γ-Polyglutamic acid (γ-PGA, H form), γ-polyglutamates (in Na$^+$, K$^+$, and NH$_4^+$ forms) and their γ-polyglutamate hydrogels showed strong and selectively binding with the toxic heavy metal ions of Pb$^{++}$, Cd$^{++}$, Al$^{+++}$, Fe$^{++}$, Fe$^{+++}$, Cu$^{++}$, Mn$^{++}$, Cr$^{+++}$, Zn$^{++}$, Ni$^{++}$, and Se$^{++++}$ and precipitate through formation of aggregated chelates which can be easily removed by conventional filtration apparatus or membrane filtration systems. Therefore, high quality drinking water, city water, and industrial water supply free of toxic heavy metals can be obtained.

According to the subject invention, γ-polyglutamic acid (γ-PGA, H form), γ-polyglutamates (in Na$^+$ K$^+$, and NH$_4^+$ forms) and their γ-polyglutamate hydrogels react with calcium salts and magnesium salts to form water soluble, stable calcium γ-polyglutamate and magnesium γ-polyglutamate, respectively. γ-Polyglutamic acid (γ-PGA, H form), γ-polyglutamates, and/or γ-polyglutamate hydrogels are excellent for dissolving and controlling the calcium salt scales or hard calcium/magnesium mixed salt scales formation normally found in water systems such as piping, tanks, and other processing equipment.

Treatments with microfiltration, ultrafiltration, ion-exchange, or reverse osmosis are not satisfactory and often leave with residual toxic heavy metals in the drinking water or city water supply systems. Those residual quantities of toxic heavy metals can be completely eliminated by using γ-polyglutamates and the γ-polyglutamate or γ-PGA based hydrogels through chelation or complexation. Upon chelating the heavy metal ions of Pb$^{++}$, Cd$^{++}$, Al$^{+++}$, Fe$^{++}$, Fe$^{+++}$, Cu$^{++}$, Mn$^{++}$, Cr$^{+++}$, Zn$^{++}$, Ni$^{++}$, and Se$^{++++}$, γ-polyglutamate molecule changes its conformation from open linear coil into enveloped aggregate through multi-dentate complexing and tightly bound the chelated heavy metal ions. The huge aggregate then precipitated out of the liquid, and was allowed to be separated from the water phase by any type of filtration systems. γ-Polyglutamic acid, γ-polyglutamates and/or γ-polyglutamate hydrogels are ideal adsorbents for completely eliminating the heavy toxic metal ions from water or aqueous systems to produce drinking water or city water supply free of heavy metal ions.

γ-Polyglutamic acid (γ-PGA, H form) contains a large number of carboxylic pendants for multiple metal binding sites. γ-Polyglutamic acid (γ-PGA, H form) exists in at least 5 different conformational states depending on the existing environment conditions. They are the α-helix at low pH (see Zanuy, D., et al., *On the Helical Conformation of Un-Ionized Poly-(γ-D-Glutamic Acid), Int'l. J. of Biological Macromolecules* 23 (1998), 175-184), beta-sheet in the microbial cell envelope, linear coil at near and neutral pH, and enveloped aggregate upon binding with certain metal ions, and the helix-random coil transitional state (see Holtzer A. et al., *The State of Aggregation of a Helical-Poly(L-Glutamic Acid) in Aqueous Salt Solutions, J. Am. Chem. Soc.* 118 (1996), 4220-). The repeat unit length is 0.15 nm in the α-helix conformational states, and 0.35 nm in the linear random-coil conformational state, respectively, and 4.8 Å for a translational turn of every 3 residues. The pK$_a$ of the side chain α-carboxyl groups on the γ-polyglutamic acid (γ-PGA, H form) is 4.06. At pH of 4.06, there exists about equal amount of non-ionized form alpha-helix form and ionized linear coil form in the aqueous solution.

Our studies showed that γ-polyglutamic acid (γ-PGA) proceeds conformational change from a linear random-coil conformation into a dense enveloped aggregate upon chelating the heavy metal ions, and precipitates out of the liquid phase, which allow for the elimination of the toxic metal ions from the water systems.

EXPERIMENTAL METHODS OF THE INVENTION

Commercial quantity of γ-polyglutamic acid (γ-PGA, H form) and its salts, γ-polyglutamates (in $Na^+$, $K^+$, and $NH_4^+$ forms) can be produced in a submerged fermentation process with *Bacillus subtilis* var. *natto*, or *Bacillus licheniformis* (see JP 05-316999) by using L-glutamic acid and glucose as main feed stocks. The microbial culture media contain carbon source, nitrogen source, inorganic minerals, and other nutrients in a proper quantity. Usually, the amount of L-glutamic acid is used at a concentration ranging from 3 to 12%, glucose at a concentration of 5-12%, citric acid at a concentration of 0.2 to 2% are used as partial carbon source; peptone and ammonium sulfate or urea are used as nitrogen sources; yeast extract is used as nutrient source; $Mn^{++}$, $Mg^{++}$ and NaCl are used as mineral sources. Under proper aeration and agitation, the culture are maintained at temperatures from 30 to 40° C., and pH is maintained at 6-7.5 by using urea solution or sodium hydroxide solution; the culture time is normally continued for a period of 48 to 84 hours. γ-Polyglutamic acid (γ-PGA, H form) and its salts, γ-polyglutamates (in $Na^+$, $K^+$, and $NH_4^+$ forms) are accumulated extracellularly.

γ-Polyglutamic acid (γ-PGA, H form) and its salts, γ-polyglutamates (in $Na^+$, $K^+$, and $NH_4^+$ forms) are normally extracted from the fermentation broth by a series of procedure including, ultra-centrifugation, or pressurized filtration to separate cells, then adding 3-4 times of ethanol to precipitate out γ-polyglutamic acid (γ-PGA, H form) and its salts, γ-polyglutamates (in $Na^+$, $K^+$, and $NH_4^+$ forms). The precipitates are re-dissolved in water, and use another portion of ethanol to precipitate out γ-polyglutamic acid (γ-PGA, H form) and its salts, γ-polyglutamates (in $Na^+$, $K^+$, and $NH_4^+$ forms). The dissolution-precipitation steps are repeated several times in order to recover pure γ-polyglutamic acid (γ-PGA, H form) and its salts, γ-polyglutamates (in $Na^+$, $K^+$, and $NH_4^+$ forms).

γ-Polyglutamic acid (γ-PGA, H form) and its salts, γ-polyglutamates (in $Na^+$, $K^+$, and $NH_4^+$ forms) are normally dissolved in a proper solvent such as water, ethanol or methanol and pH is adjusted to 5.0 to 7.5. The properly selected multiple functional chemical cross-linking agents such as polyglycerol polyglycidyl ethers, sorbitol-based polyglycidyl ethers, polyethylene glycol diglycidyl ether, or trimethylolpropane triacrylate are added to the solution under constantly stirring, at a dose rate ranging from 0.01 to 20% of the weight of γ-polyglutamic acid (γ-PGA, H form) and its salts, γ-polyglutamates (in $Na^+$, $K^+$, and $NH_4^+$ forms), depending on the type of cross-linking agents and the quality of hydrogels required. The gelling reaction is normally completed within 1 to 4 hours at a reaction temperature from 50 to 120° C. depending on the equipment and conditions used. The hydrogels formed are then freeze-dried to produce dried cross-linked γ-polyglutamic acid (γ-PGA, H form) and its salts, γ-polyglutamate hydrogels (prepared from γ-polyglutamates in $Na^+$, $K^+$, and $NH_4^+$ forms), which possess super water absorption capacity, are non-water soluble, and form colorless, transparent and biodegradable hydrogels when fully swell in water.

γ-Polyglutamic acid (γ-PGA, H form) and its salts, γ-polyglutamates (in $Na^+$, $K^+$, and $NH_4^+$ forms) with molecular weight ranging from 5,000 to 900,000 can be produced by controlled acidic-hydrolysis at a specific selected reaction conditions of pH, temperature, reaction time and concentration of γ-polyglutamic acid (γ-PGA, H form). The pH can be controlled from pH 2.5 to 6.5 with proper acidulants such as HCl, $H_2SO_4$, or other organic acids, the hydrolysis temperature can be controlled in the range from 50 to 100° C., the reaction time from 0.5 to 5 hours, and the concentration of γ-polyglutamic acid (γ-PGA, H form) with molecular weight from $1 \times 10^6$ and higher can be any concentration as convenient as required. After the reaction is completed, further purification with dialysis or membrane filtration and drying are necessary to produce high purity small and middle molecular weight γ-polyglutamic acid (γ-PGA, H form) and its salts, γ-polyglutamates (in $Na^+$, $K^+$, and $NH_4^+$ forms) of choice. The acid-hydrolysis rate is faster at lower pH, higher temperature, and higher concentration of γ-polyglutamic acid (γ-PGA, H form). The γ-polyglutamate salts (in $Na^+$, $K^+$, and $NH_4^+$ forms) can be produced by reaction of selected γ-polyglutamic acid (γ-PGA, H form) with basic hydroxide solution or oxide of the metal ions ($Na^+$, $K^+$, $NH_4^+$) of choice and pH adjusted to desired condition from 5.0 to 7.2. as required.

EXPERIMENTAL EXAMPLES

In order to further explain this invention, the experimental examples are presented in the following to show how this invention can be utilized to remove the toxic metal ions from water, and dissolve calcium and magnesium scales of calcium and/or magnesium origin. But the scope of this invention is not limited by these experimental examples.

Experimental Example 1

Absorption of $Pb^{++}$ with γ-polyglutamate (in $Na^+$ Form)

A 100 ml working solution of 2% γ-polyglutamate (in $Na^+$ form) was prepared by dissolving γ-polyglutamic acid (γ-PGA, H form) with molecular weight of $890 \times 10^3$ in deionized water, and pH was adjusted to 6.0 with 20% NaOH solution. A 25 ml working solution of $10^{-2}$ M $Pb(NO_3)_2$ was prepared from C.P. grade $Pb(NO_3)_2$. 15 ml of a series of different concentrations of $Pb(NO_3)_2$ in the final concentration of 0.09, 0.12, 0.17, 0.22, 0.36, and 0.45 mmol/L were prepared and 25 ml of 0.016% γ-polyglutamate (in $Na^+$ form) was added to each of the $Pb(NO_3)_2$ solution, mix well and pH was then adjusted with 10% NaOH solution to pH 6.0, de-ionized water was added to a total final volume of 50 ml. The mixtures were mixed well and let stood for 30 minutes for complete chelation, then the precipitates were filtered using an ultrafiltration membrane filtration cartridge with a molecular weight cut-off of 20,000 daltons to separate the precipitates. The residual $Pb^{++}$ ion concentrations in clear filtrate were then determined using an ICP/MS analyzer.

The results from experimental example 1 were shown in Table 2.

TABLE 2

Chelation of $Pb^{++}$ ion with γ-polyglutamic acid (γ-PGA, H form) at 25° C., pH 6.0, and 0.008% γ-polyglutamic acid

| Original conc. of $Pb^{++}$, $[Pb^{++}]_o$, mMol./L | Conc. of $Pb^{++}$ in Filtrate, mMol./L | $Pb^{++}$ adsorbed by γ-PGA, mMol./L | $Pb^{++}$ adsorbed by γ-PGA, mMol./g |
|---|---|---|---|
| 0.09 | 0.00 | 0.09 | 1.09 |
| 0.12 | 0.00 | 0.12 | 1.48 |
| 0.17 | 0.00 | 0.17 | 2.15 |
| 0.22 | 0.00 | 0.22 | 2.66 |
| 0.36 | 0.03 | 0.33 | 4.07 |
| 0.45 | 0.14 | 0.31 | 4.12 |

The above results showed that $Pb^{++}$ ions were chelated with γ-polyglutamate and formed stable white precipitates in the form of $Pb^{++}$ and γ-PGA complex aggregates. The saturated absorption capacity is about 4 mMol. of $Pb^{++}$ per gram of γ-PGA.

Experimental Example 2

Absorption of $Cd^{++}$ with γ-polyglutamate (in $Na^+$ Form).

In experimental example 1, C.P. grade $Cd(NO_3)_2$ was used to replace $Pb(NO_3)_2$, and the same experiment was repeated with a series of different concentrations of $Cd(NO_3)_2$ in the final concentrations of 0.09, 0.12, 0.17, 0.21, 0.34, and 0.42 mMol./L were used.

The results from experimental example 2 were shown in Table 3.

TABLE 3

Chelation of $Cd^{++}$ ion with γ-polyglutamic acid (γ-PGA, H form) at 25° C., pH 6.0, and 0.008% γ-polyglutamic acid

| Original conc. of $Cd^{++}$, $[Cd^{++}]_o$, mMol./L | Conc. of $Cd^{++}$ in Filtrate, mMol./L | $Cd^{++}$ adsorbed by γ-PGA, mMol./L | $Cd^{++}$ adsorbed by γ-PGA, mMol./g |
|---|---|---|---|
| 0.09 | 0.00 | 0.09 | 1.15 |
| 0.12 | 0.00 | 0.12 | 1.52 |
| 0.17 | 0.00 | 0.17 | 2.09 |
| 0.21 | 0.00 | 0.21 | 2.65 |
| 0.34 | 0.04 | 0.30 | 3.71 |
| 0.42 | 0.12 | 0.30 | 3.73 |

The above results showed that $Cd^{++}$ ions were chelated with γ-polyglutamate and formed stable precipitates in the form of $Cd^{++}$ and γ-PGA complex aggregates. The saturated absorption capacity is about 3.7 mMol. of $Cd^{++}$ per gram of γ-PGA.

Experimental Example 3

Absorption of $Cu^{++}$ with γ-polyglutamate (in $Na^+$ Form)

In experimental example 1, C.P. grade $Cu(NO_3)_2$ was used to replace $Pb(NO_3)_2$, and the same experiment was repeated with a series of different concentrations of $Cu(NO_3)_2$ in the final concentrations of 0.08, 0.11, 0.16, 0.20, 0.33, and 0.42 mMol./L were used.

The results from experimental example 3 were shown in Table 4.

TABLE 4

Chelation of $Cu^{++}$ ion with γ-polyglutamic acid (γ-PGA, H form) at 25° C., pH 6.0, and 0.008% γ-polyglutamic acid

| Original conc. of $Cu^{++}$, $[Cu^{++}]_o$, mMol./L | Conc. of $Cu^{++}$ in Filtrate, mMol./L | $Cu^{++}$ adsorbed by γ-PGA, mMol./L | $Cu^{++}$ adsorbed by γ-PGA, mMol./g |
|---|---|---|---|
| 0.08 | 0.00 | 0.08 | 1.03 |
| 0.11 | 0.00 | 0.11 | 1.42 |
| 0.16 | 0.00 | 0.16 | 1.99 |
| 0.20 | 0.00 | 0.20 | 2.56 |
| 0.33 | 0.00 | 0.33 | 4.16 |
| 0.42 | 0.03 | 0.39 | 4.85 |

The above results showed that $Cu^{++}$ ions were chelated with γ-polyglutamate and formed stable cyan precipitates in the form of $Cu^{++}$ and γ-PGA complex aggregates. The saturated absorption capacity is about 4.5 mMol. of $Cu^{++}$ per gram of γ-PGA.

Experimental Example 4

Absorption of $Fe^{++}$ with γ-polyglutamate (in $Na^+$ Form)

In experimental example 1, C.P. grade $Fe(NO_3)_2$ was used to replace $Pb(NO_3)_2$, and the same experiment was repeated with a series of different concentrations of $Fe(NO_3)_2$ in the final concentrations of 0.024, 0.031, 0.045, 0.060, 0.093, and 0.126 mMol./L, and pH 4.0 were used.

The results from experimental example 4 were shown in Table 5.

TABLE 5

Chelation of $Fe^{++}$ ion with γ-polyglutamic acid (γ-PGA, H form) at 25° C., pH 4.0, and 0.002% γ-polyglutamic acid

| Original conc. of $Fe^{++}$, $[Fe^{++}]_o$, mMol./L | Conc. of $Fe^{++}$ in Filtrate, mMol./L | $Fe^{++}$ adsorbed by γ-PGA, mMol./L | $Fe^{++}$ adsorbed by γ-PGA, mMol./g |
|---|---|---|---|
| 0.024 | 0.006 | 0.018 | 0.93 |
| 0.031 | 0.006 | 0.025 | 1.23 |
| 0.045 | 0.008 | 0.037 | 1.82 |
| 0.060 | 0.010 | 0.050 | 2.52 |
| 0.093 | 0.020 | 0.073 | 3.68 |
| 0.126 | 0.038 | 0.088 | 4.37 |

The above results showed that $Fe^{++}$ ions were chelated with γ-polyglutamate and formed stable yellow precipitates in the form of $Fe^{++}$ and γ-PGA complex aggregates. The saturated absorption capacity is about 0.5 mMol. of $Fe^{++}$ per gram of γ-PGA.

Experimental Example 5

Absorption of $Al^{+++}$ with γ-polyglutamate (in $Na^+$ Form)

In experimental example 1, C.P. grade $Al(NO_3)_3$ was used to replace $Pb(NO_3)_2$, and the same experiment was repeated with a series of different concentrations of $Al(NO_3)_2$ in the final concentrations of 0.041, 0.053, 0.073, 0.092, 0.153, and 0.193 mMol./L, and pH 4.0 were used.

The results from experimental example 5 were shown in Table 6.

TABLE 6

Chelation of $Al^{+++}$ ion with γ-polyglutamic acid (γ-PGA, H form) at 25° C., pH 4.0, and 0.008% γ-polyglutamic acid

| Original conc. of $Al^{+++}$, $[Al^{+++}]_o$, mMol./L | Conc. of $Al^{+++}$ in Filtrate, mMol./L | $Al^{+++}$ adsorbed by γ-PGA, mMol./L | $Al^{+++}$ adsorbed by γ-PGA, mMol./g |
|---|---|---|---|
| 0.041 | 0.001 | 0.040 | 1.91 |
| 0.053 | 0.001 | 0.052 | 2.59 |
| 0.073 | 0.018 | 0.055 | 2.75 |
| 0.092 | 0.035 | 0.057 | 2.84 |
| 0.153 | 0.091 | 0.062 | 3.11 |
| 0.193 | 0.126 | 0.067 | 3.32 |

The above results showed that $Al^{+++}$ ions were chelated with γ-polyglutamate and formed stable white precipitates in the form of $Al^{+++}$ and γ-PGA complex aggregates. The saturated absorption capacity is about 2.0 mMol. of $Al^{+++}$ per gram of γ-PGA.

Experimental Example 6

Competitive Absorption of $Pb^{++}$, $Cd^{++}$, and $Cu^{++}$ in a Mixture with γ-polyglutamate (in $Na^+$ Form)

In experimental example 1, C.P. grade $Pb(NO_3)_2$, $Cd(NO_3)_2$ and $Cu(NO_3)_2$ were used, and the same experiment was repeated with different concentration of $Pb(NO_3)_2$, $Cd(NO_3)_2$ and $Cu(NO_3)_2$ in the final volume of 50 ml.

The results from experimental example 6 were shown in Table 7.

TABLE 7

Competitive chelation of $Pb^{++}$, $Cd^{++}$, and $Cu^{++}$ ions in a mixture with γ-polyglutamate (in $Na^+$ form) at 25° C., pH 6.0 (0.002% γ-polyglutamic acid was used in this study).

| | Metal ions in the mixture | Ion concentration mMol./L | Ion concentration mMol./L |
|---|---|---|---|
| $Pb^{++}$ | $[Pb^{++}]$ original, $[Pb^{++}]_o$ | 0.0306 | 0.0647 |
| | $Pb^{++}]$ free in filtrate | 0.0002 | 0.0101 |
| | $[Pb^{++}]$ absorbed by γ-PGA | 1.52 mMol./g | 2.73 mMol./g |
| $Cd^{++}$ | $[Cd^{++}]$ original, $[Cd^{++}]_o$ | 0.033 | 0.0668 |
| | $Cd^{++}]$ free in filtrate | 0.0147 | 0.0648 |
| | $[Cd^{++}]$ absorbed by γ-PGA | 0.91 mMol./g | 0.10 mMol./g |
| $Cu^{++}$ | $[Cu^{++}]$ original, $[Cu^{++}]_o$ | 0.0323 | 0.0668 |
| | $Cu^{++}]$ free in filtrate | 0.0032 | 0.0404 |
| | $[Cu^{++}]$ absorbed by γ-PGA | 1.46 mMol./g | 1.33 mMol./g |

The results in Table 7 showed that the competitive chelation of heavy metal ions with γ-polyglutamate (in $Na^+$ form) at 25° C., pH 6.0. are in the order: $Pb^{++}>Cu^{++}>Cd^{++}$. The original ion concentrations were reduced from 0.03 mMol./L to 0.0002, 0.0032, and 0.0147 mMol./L for $Pb^{++}$, $Cd^{++}$, and $Cu^{++}$ ions, respectively. With more than saturated quantity of γ-polyglutamate (in $Na^+$ form) used, the heavy metal ions of $Pb^{++}$, $Cd^{++}$, and $Cu^{++}$ can be completely absorbed and resulting in precipitation of aggregates of chelated complexes.

Experimental Example 7

Effect of pH on Competitive Absorption of $Pb^{++}$, $Cd^{++}$, and $Cu^{++}$ in a Mixture with γ-polyglutamate (in $Na^+$ Form)

In experimental example 1, C.P. grade $Pb(NO_3)_2$, $Cd(NO_3)_2$ and $Cu(NO_3)_2$ were used, and the same experiment was repeated at 25° C. and pH 4.28 with different concentration of $Pb(NO_3)_2$, $Cd(NO_3)_2$ and $Cu(NO_3)_2$ in the final volume of 50 ml.

The results from experimental example 7 were shown in Table 8.

TABLE 8

Effect of pH on competitive chelation of $Pb^{++}$, $Cd^{++}$, and $Cu^{++}$ ions in a mixture with γ-polyglutamate (in $Na^+$ form) at 25° C., pH 4.28 (0.002% γ-polyglutamic acid was used in this study)

| | Metal ions in the mixture | Ion concentration mMol./L | Ion concentration mMol./L |
|---|---|---|---|
| $Pb^{++}$ | $[Pb^{++}]$ original, $[Pb^{++}]_o$ | 0.0306 | 0.0647 |
| | $Pb^{++}]$ free in filtrate | 0.0026 | 0.0163 |
| | $[Pb^{++}]$ absorbed by γ-PGA | 1.45 mMol./g | 2.42 mMol./g |
| $Cd^{++}$ | $[Cd^{++}]$ original, $[Cd^{++}]_o$ | 0.033 | 0.0668 |
| | $Cd^{++}]$ free in filtrate | 0.0312 | 0.0668 |
| | $[Cd^{++}]$ absorbed by γ-PGA | 0.09 mMol./g | 0.00 mMol./g |

TABLE 8-continued

Effect of pH on competitive chelation of $Pb^{++}$, $Cd^{++}$, and $Cu^{++}$ ions in a mixture with γ-polyglutamate (in $Na^+$ form) at 25° C., pH 4.28 (0.002% γ-polyglutamic acid was used in this study)

| | Metal ions in the mixture | Ion concentration mMol./L | Ion concentration mMol./L |
|---|---|---|---|
| $Cu^{++}$ | $[Cu^{++}]$ original, $[Cu^{++}]_o$ | 0.0323 | 0.0670 |
| | $Cu^{++}]$ free in filtrate | 0.00264 | 0.0668 |
| | $[Cu^{++}]$ absorbed by γ-PGA | 0.29 mMol./g | 0.01 mMol./g |

The results in Table 8 showed that the competitive chelation of heavy metal ions with γ-polyglutamate (in $Na^+$ form) at 25° C., pH 4.28. are in the order: $Pb^{++}>Cu^{++}>Cd^{++}$. The original ion concentrations were reduced from 0.03 mMol./L to 0.0026, 0.00265, and 0.0312 mMol./L for $Pb^{++}$, $Cu^{++}$, and $Cd^{++}$ ions, respectively. Obviously, the lower pH of the solution, the less chelating capacity for γ-polyglutamate (in $Na^+$ form). The chelating capacities were reduced from 1.52, 1.46, 0.91 mMol./g adsorbed to 1.45, 0.29, and 0.09 mMol./L for $Pb^{++}$, $Cu^{++}$, and $Cd^{++}$ ions, respectively. The maximum chelating capacities of $Pb^{++}$, $Cu^{++}$, and $Cd^{++}$ ions by γ-polyglutamate (in $Na^+$ form) appear to be in the range from pH 6 to pH 7.5, which coincide with the pH range of a fully opened linear random coil conformation of γ-polyglutamate (in $Na^+$ form). With more than saturated quantity of γ-polyglutamate (in $Na^+$ form) used, the heavy metal ions of $Pb^{++}$, $Cd^{++}$, and $Cu^{++}$ can be completely absorbed and resulting in precipitation of aggregates of chelated complexes.

Experimental Example 8

Saturation Binding of $Pb^{++}$, $Cd^{++}$, and $Cu^{++}$ with γ-polyglutamate (in $Na^+$ Form) in Water In experimental example 1, C.P. grade $Pb(NO_3)_2$, $Cd(NO_3)_2$ and $Cu(NO_3)_2$ were used, and the same experiment was repeated at 25° C. and pH 6.0 with different concentrations of γ-polyglutamate (in $Na^+$ form).

The results from experimental example 8 were shown in Table 9.

TABLE 9

Saturation binding of $Pb^{++}$, $Cd^{++}$, and $Cu^{++}$ with γ-polyglutamate (in $Na^+$ form) in water at 25° C. and pH 6.0

| Original conc. Of $Pb^{++}$, $[Pb^{++}]_o$, | $Pb^{++}$ adsorbed by γ-PGA, mMol./g at different concentration of original conc. of γ-PGA, $[γ-PGA]_o$ | | |
|---|---|---|---|
| mMol./L | 0.002% | 0.004% | 0.008% |
| 0.09 | 3.99 | 2.34 | 1.04 |
| 0.13 | 4.18 | 3.03 | 1.54 |
| 0.17 | 4.37WP | 3.95 | 2.15 |
| 0.22 | 4.50WP | 4.03WP | 2.71WP |
| 0.35 | 4.56WP | 4.11WP | 4.07WP |
| 0.45 | — | — | — |

TABLE 9-continued

Saturation binding of $Pb^{++}$, $Cd^{++}$, and $Cu^{++}$ with γ-polyglutamate (in $Na^+$ form) in water at 25° C. and pH 6.0

| Original conc. of $Cd^{++}$, $[Cd^{++}]_o$, mMol./L | $Cd^{++}$ adsorbed by γ-PGA, mMol./g at different concentration of original conc. of γ-PGA, $[γ\text{-PGA}]_o$ | | |
|---|---|---|---|
| | 0.002% | 0.004% | 0.008% |
| 0.09 | 4.43 | 2.68 | 1.15 |
| 0.12 | 4.35 | 3.10 | 1.52 |
| 0.17 | 4.20WP | 3.89 | 2.09 |
| 0.21 | 4.15WP | 3.90WP | 2.65 |
| 0.34 | 3.64WP | 3.84WP | 3.71WP |
| 0.42 | 3.38WP | 3.56WP | 3.73WP |

| Original conc. of $Cu^{++}$, $[Cu^{++}]_o$, mMol./L | $Cu^{++}$ adsorbed by γ-PGA, mMol./g at different concentration of original conc. of γ-PGA, $[γ\text{-PGA}]_o$ | | |
|---|---|---|---|
| | 0.002% | 0.004% | 0.008% |
| 0.08 | 4.06 | 2.29 | 1.03 |
| 0.11 | 4.84 | 3.03 | 1.42 |
| 0.16 | 4.89CP | 4.00 | 1.99 |
| 0.20 | 4.97CP | 4.71CP | 2.56CP |
| 0.33 | 5.90CP | 5.42CP | 4.16CP |
| 0.42 | 5.90CP | 5.43CP | 4.85CP |

Note:
WP means white precipitates formed,
CP means cyan precipitates formed.

The above results showed that $Pb^{++}$, $Cd^{++}$, and $Cu^{++}$ ions were chelated with γ-polyglutamate to form stable white, white, and cyan precipitates of metal ions and γ-PGA complex aggregates, respectively. The saturated absorption capacity is about 2.0 mMol.

The invention claimed is:

1. A method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, or γ-polyglutamate in $NH_4^+$ form, or a mixture thereof as a chelating agent for removing a heavy metal and/or as a dissolving agent for removing calcium and/or magnesium scales from water or the aqueous system, wherein said water or aqueous system has a pH ranging from 6.0 to 8.0.

2. The method of claim 1, wherein said heavy metal is Pb, Cd, Al, Fe, Cu, Mn, Cr, Zn, Ni, or Se.

3. A method for removing a heavy metal from and/or dissolving calcium and/or magnesium scales in water or an aqueous system comprising using γ-polyglutamate hydrogel as a chelating agent for removing a heavy metal and/or as a dissolving agent for removing calcium and/or magnesium scales from water or the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked with diglycerol polyglycidyl ether, polyglycerol polyglycidyl ether, sorbitol polyglycidyl ether, polyoxyethylene sorbitol polyglycidyl ether, polysorbitol polyglycidyl ether, or polyethylene glycol diglycidyl ether, or a mixture thereof, wherein said water or aqueous system has a pH ranging from 6.0 to 8.0.

4. The method of claim 3, wherein said heavy metal is Pb, Cd, Al, Fe, Cu, Mn, Cr, Zn, Ni, or Se.

5. A method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, or y-polyglutamate in $NH_4^+$ form, or a mixture thereof in combination with a γ-polyglutamate hydrogel as a chelating agent for removing a heavy metal and/or as a dissolving agent for removing calcium and/or magnesium scales from water or the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked with diglycerol polyglycidyl ether, polyglycerol polyglycidyl ether, sorbitol polyglycidyl ether, polyoxyethylene sorbitol polyglycidyl ether, polysorbitol polyglycidyl ether, or polyethylene glycol diglycidyl ether, or a mixture thereof, wherein said water or aqueous system has a pH ranging from 6.0 to 8.0.

6. The method of claim 5, wherein said heavy metal is Pb, Cd, Al, Fe, Cu, Mn, Cr, Zn, Ni, or Se.

7. A method for removing a heavy metal from and/or dissolving calcium and/or magnesium scales in water or an aqueous system comprising using a γ-polyglutamate hydrogel as a chelating agent for removing a heavy metal and/or as a dissolving agent for removing calcium and/or magnesium scales from water and the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked by irradiation with gamma ray or electron beams, wherein said water or aqueous system has a pH ranging from 6.0 to 8.0.

8. The method of claim 7, wherein said heavy metal is Pb, Cd, Al, Fe, Cu, Mn, Cr, Zn, Ni, or Se.

9. A method for removing a heavy metal from and/or dissolving calcium and/or magnesium scales in water or an aqueous system comprising using γ-polyglutamic acid (γ-PGA, H form), γ-polyglutamate in $Na^+$ form, γ-polyglutamate in $K^+$ form, or γ-polyglutamate in $NH_4^+$ form, or a mixture thereof in combination with a γ-polyglutamate hydrogel as a chelating agent for removing a heavy metal and/or as a dissolving agent for removing calcium and/or magnesium scales from water or the aqueous system, wherein said γ-polyglutamate hydrogel is prepared from γ-polyglutamate in $Na^+$ form, γ-polyglutamate in $K^+$ form, or γ-polyglutamate in $NH_4^+$ form, or a mixture thereof cross-linked by irradiation with gamma ray or electron beams, wherein said water or aqueous system has a pH ranging from 6.0 to 8.0.

10. The method of claim 9, wherein said heavy metal is Pb, Cd, Al, Fe, Cu, Mn, Cr, Zn, Ni, or Se.

* * * * *